United States Patent
Huang et al.

(10) Patent No.: US 7,486,592 B2
(45) Date of Patent: Feb. 3, 2009

(54) OPTICAL HEAD HAVING DUAL OPTICAL PATHS

(75) Inventors: Chun-Chieh Huang, Taipei (TW); Chen-I Kuo, Taichung (TW); Hsiang-Chieh Yu, Taipei (TW); Jau-Jiu Ju, Chu-Tung (TW); Chi-Lone Chang, Hsinchu County (TW); Yuan-Chin Lee, Hsinchu (TW); Chau-Yuan Ke, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/149,235

(22) Filed: Apr. 29, 2008

(65) Prior Publication Data

US 2008/0205203 A1  Aug. 28, 2008

Related U.S. Application Data

(63) Continuation-in-part of application No. 11/074,731, filed on Mar. 9, 2005, now abandoned.

(30) Foreign Application Priority Data

Jul. 2, 2004  (TW) ............................... 93120006 A

(51) Int. Cl.
 *G11B 7/00* (2006.01)
(52) U.S. Cl. ................................ 369/13.12; 369/112.01
(58) Field of Classification Search ............. 369/13.12, 369/13.11, 112.01, 112.24, 112.12, 112.28, 369/120
See application file for complete search history.

(56) References Cited

U.S. PATENT DOCUMENTS

| | | | |
|---|---|---|---|
| 5,446,565 A | 8/1995 | Komma et al. | |
| 5,673,247 A | 9/1997 | Sekimoto et al. | |
| 6,021,107 A | 2/2000 | Tsukahara et al. | |
| 6,097,690 A | 8/2000 | Mochizuki et al. | |
| 6,163,409 A | 12/2000 | Uchiyama et al. | |
| 6,304,542 B1 | 10/2001 | Dang et al. | |
| 6,324,150 B1 | 11/2001 | Ju et al. | |
| 6,625,099 B2 | 9/2003 | Nakano et al. | |
| 6,819,647 B2 | 11/2004 | Saitoh et al. | |
| 6,914,868 B1 * | 7/2005 | Redmond et al. | 369/112.01 |
| 7,193,954 B2 | 3/2007 | Yagi et al. | |
| 2001/0040854 A1 | 11/2001 | Lee et al. | |

FOREIGN PATENT DOCUMENTS

KR  00255233 B1  2/2000

* cited by examiner

*Primary Examiner*—Ali Neyzari
(74) *Attorney, Agent, or Firm*—Rabin & Berdo, P.C.

(57) ABSTRACT

An optical head to access data on an optical recording medium, which has two data storage densities, includes two sets of optical path systems to provide two optical paths that are crossed. Each optical path system includes a laser light generation unit, a light guiding unit, a converging objective lens and a photo detector. The light guiding unit is located on the optical path of the laser light generation unit, to direct the laser light to pass through the converging objective lens and focus on the data side of the optical recording medium to carry optical data signals from the data side. The laser light returns to the light guiding unit and travels along the optical path and is received by the photo detector.

9 Claims, 6 Drawing Sheets

OPTICAL HEAD HAVING DUAL OPTICAL PATHS

CROSS-REFERENCE TO RELATED APPLICATIONS

This application is a continuation-in-part patent application of U.S. application Ser. No. 11/074,731 filed on Mar. 9, 2005, the entire contents of which are hereby incorporated by reference for which priority is claimed under 35 U.S.C. § 120.

FIELD OF THE INVENTION

The present invention relates to an optical head and particularly to an optical head that has dual optical paths.

BACKGROUND OF THE INVENTION

Using an optical head to access data on an optical recording medium is a technique known in the art. While the storage capacity and density of the optical recording medium has increased gradually, the structure of the optical head has also improved. One of the advanced features is that the wavelength of laser light to access the optical recording medium becomes shorter, and the numerical aperture (NA) of the objective lens gradually increases (i.e. the converging focal point of the laser light to access the optical recording medium becomes smaller, its size is in direct proportion with the wavelength of the laser light, but is in inverse proportion with the NA of the objective lens) to respond to the increasing storage capacity and density of the optical recording medium.

The new type of optical head has to be inversely compatible. Namely, it must be able to access new types of optical recording media and also has to access the older types of optical recording media. Hence the new type of optical head has to equip with a read/write mechanism for laser light of different wavelengths. As a result, optical recording media capable of storing data of two different densities have been developed. For instance, now many optical heads can read/write a Compact Disk (CD) and a Digital Versatile Disk (DVD).

One example is U.S. Pat. No. 5,446,565, which discloses a dual focal points converging objective lens that can form different NA of the objective lens. When a laser light generation unit generates laser light, which travels to a holographic optical element (HOE), the laser light forms diffraction because of the HOE, and the converging objective lens focuses the light on an optical recording medium. Using the characteristics of the HOE that can form two diffraction angles, and is coupled with the converging objective lens, the laser light may be converged to different foal points (the data surface of the optical recording medium that has different data storage densities) to access the optical recording medium that has two different data storage densities. However, the HOE is more expensive in fabrication.

Based on cost consideration, employing two light sources and two objective lenses is a more economic choice. Korea patent No. 00255233 discloses a technique that uses laser light of two different wavelengths to couple with different lenses to provide different focal points and read optical spots of different diameters. The optical head allows laser lights of different wavelengths generated by two laser light generation units to travel their own optical paths to reach the converging objective lens. And according to different NA of the objective lens corresponding to the laser light of different wavelengths, different sizes of focal points are formed. After reflected by the optical recording medium, each travels back to its own photo detector, thereby can access the optical recording medium that has two different data storage densities. But the dual optical paths system significantly increases the size of the whole device. This is against the prevailing requirements of 3C products.

SUMMARY OF THE INVENTION

In view of the aforesaid disadvantages occurring to conventional techniques, the primary object of the present is to provide an optical head that has dual optical paths to access data on an optical recording medium, having two different data storage densities and reducing the size of the optical head.

The optical head that has dual optical paths according to the invention aims to read/write an optical recording medium that has different data storage densities. It consists of two sets of optical path systems. Each optical path system includes a laser light generation unit, a light guiding unit, a converging objective lens and a photo detector. The two laser light generation units generate laser lights of different wavelengths. The light guiding unit is located on the optical path of the laser light generation unit to direct the laser light generated by the laser light generation unit to travel, and pass through the converging objective lens, and focus on the data side of the optical recording medium. The focused laser light is reflected on the optical recording medium and carries optical data signals recorded on the data side, and returns to the light guiding unit along the optical path, to be received by the photo detector for transforming to corresponding electric signals. The optical paths of the two optical path systems are crossed to shrink the total size of the optical head.

The present invention further includes an optical head, which has an actuator for holding the two optical path systems. It includes an objective lens holding seat, a focus coil, a track coil, a magnetic path device and a plurality of metal wires. The converging objective lenses of the two optical path systems are located on the topside of the objective lens holding seat. The focus coil is located on the objective lens holding seat and has the inductive magnetic direction coincided with the focusing direction of the converging objective lens. The track coil is located on the objective lens holding seat and has the inductive magnetic direction normal to the focusing direction to serve as the track direction. The magnetic path device generates a magnetic field in a direction parallel with the inductive magnetic field of the track coil and normal to inductive magnetic field direction of the focus coil. The metal wires aim to brace the objective lens holding seat and enable the objective lens holding seat to be movable in the focusing direction and the track direction.

Further, each of the two objective lenses of the two optical path systems respectively has a center. Both centers of the two objective lenses are arranged at a radial direction of the optical recording medium while the actuator moves between an innermost track and an outermost track of the optical recording medium. Therefore, much more precise electric signals can be obtained by the optical head.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
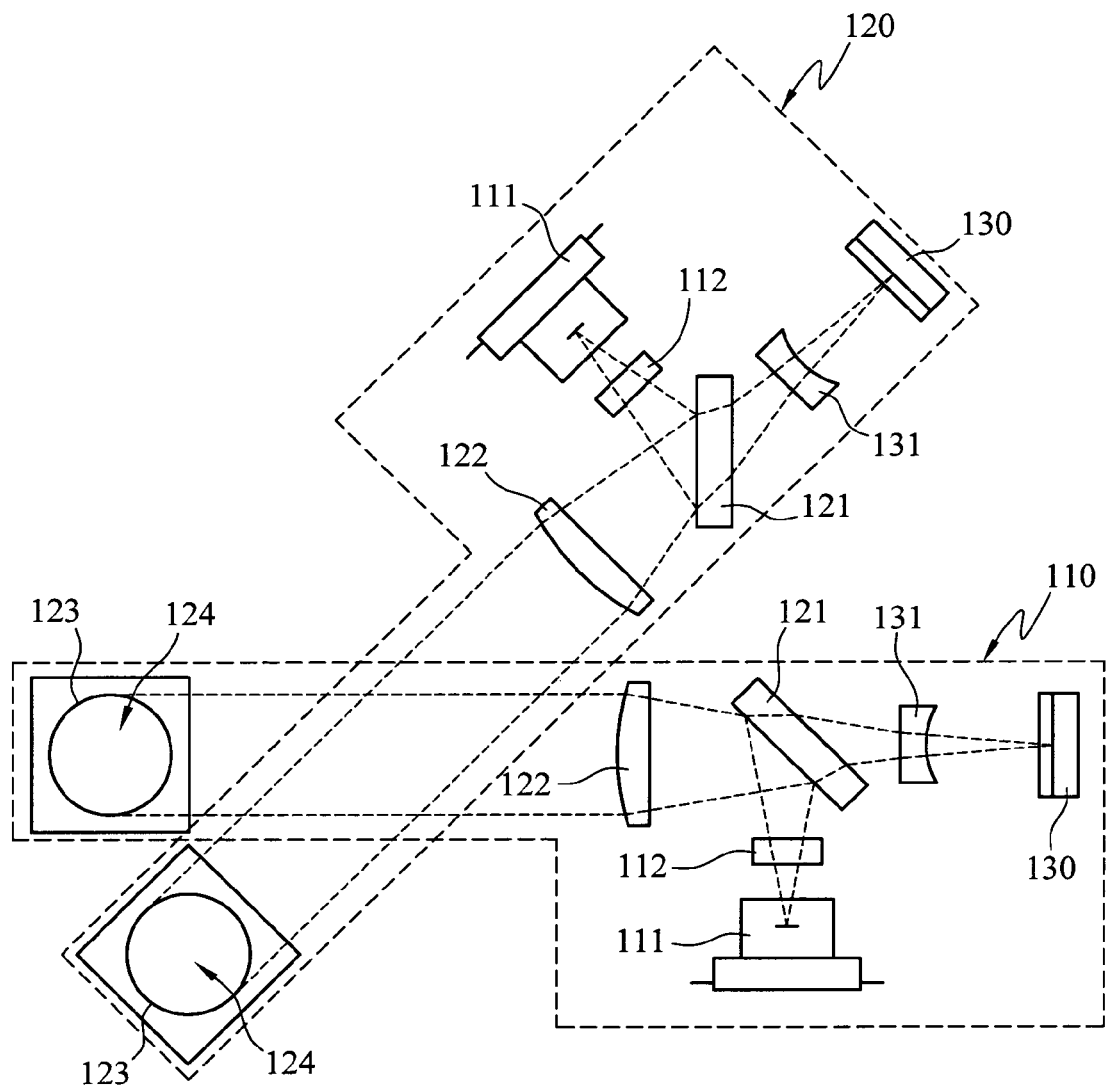
FIG. 1 is a schematic view of an embodiment of the present invention.

The optical head of multiple wavelengths according to the present invention aims to access data on an optical recording medium that has different data storage densities. Refer to FIG. 1 for an embodiment of the invention. It includes a first optical path system 110 and a second optical path system 120 that are crossed to reduce the size of the optical head.

The first optical path system 110 and the second optical path system 120 include respectively a laser light generation unit, a light guiding unit, a converging objective lens (not shown in the drawing) and a photo detector 130. The laser light generation unit includes a laser diode 111 and a diffraction grating 112. The laser diode 111 emits a linear polarized laser light. The diffraction grating 112 changes the emitted laser light into a laser light for reading and tracking.

The light guiding unit is located on the optical path of the laser light generation unit, for direct traveling of the laser light generated by the laser light generation unit and passing through the converging objective lens and focusing on the data side of the optical recording medium. The focused laser light is reflected and returns to the light guiding unit along the optical path to be received by the photo detector 130 for transforming the optical data signals to corresponding electric signals. As shown in FIG. 1, the light guiding unit includes a beam-splitter 121, a collimator 122 and a folding mirror 123. The beam-splitter 121 first reflects the laser light generated by the laser light generation unit. The laser light passes through the collimator 122 to become parallel light, then reaches the folding mirror 123 to be directed to the converging objective lens 124. The laser light is converged by the converging objective lens 124 and focuses on the data side of the optical recording medium. The focused laser light is reflected on the optical recording medium, and passes along the optical path to the folding mirror 123, the collimator 122 and the beam-splitter 121, and finally is received by the photo detector 130. In this embodiment, a concave lens 131 is provided and located on the optical path before the laser light reaches the photo detector 130 to amend the optical signal quality reflected by the optical disk. By means of such a construction, the first optical path system 110 and the second optical path system 120 can read the optical recording medium that has two different data densities. The two optical paths cross at about 30 to 150 degrees to enable the whole space to be fully utilized.

For a data writing process on the optical recording medium, the optical path of the incident laser light and the reflection laser light is the same as the one of data reading previously discussed. The difference is that, in the writing process, a function generator is used to regulate the driving circuit of the laser light generation unit, so that the energy of laser light may be altered as desired. Through a photothermal effect, a physical change occurs to the material of the optical recording medium. According to the energy of the laser light, pits that represent the data of "0" or "1" are formed on the data storage surface of the optical recording medium. To make the optical head reading the data smoothly, the optical head actuator should be able to perform a parallel focus to allow the laser light passing through the objective lens, to focus accurately on the data recording layer of the disk. A parallel tracking characteristic is needed to keep the focal point in the center of the data track of the data recording layer of the data recording medium.

Figure 2:
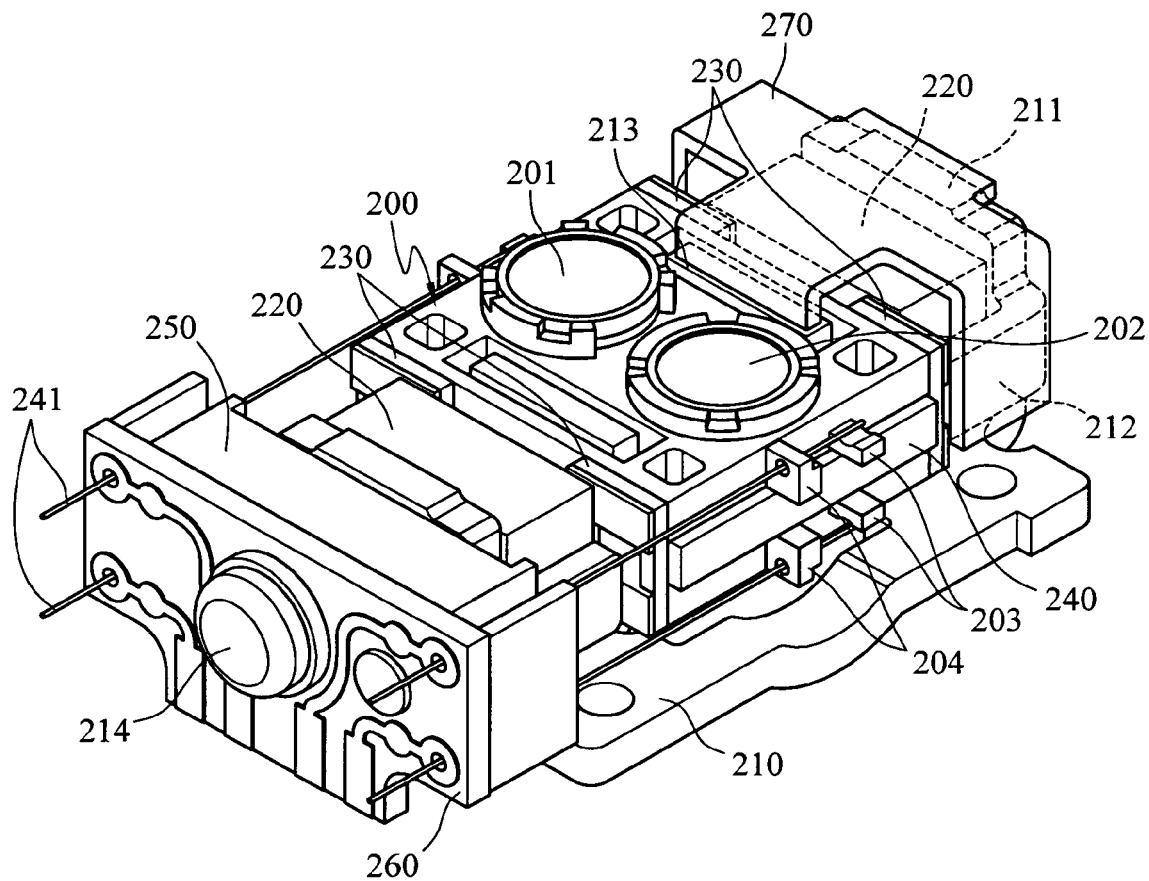
FIG. 2 is a schematic view of an embodiment of the actuator of the present invention.

The optical head according to the invention further includes an actuator for holding the two optical path systems. Refer to FIG. 2 for an embodiment of the actuator of the invention. It includes a magnetic path device which includes of an objective lens holding seat 200, a focus coil 240, a track coil 230, a yoke 210 and a magnet 220, four metal wires 241, a damper holding dock 250 and a circuit board 260. The objective lenses 201 and 202 of the two optical path systems are located on the top side of the objective lens holding seat 200 in two openings formed thereon side by side. The objective lens holding seat 200 has a plurality of first lugs 204 and second lugs 203 extended from a lateral side. Each of the first lugs 204 has a conical opening, to allow one metal wire 241 to pass through. The second lugs 203 are in contact with a distal end of the focus coil 240 or the track coil 230, to facilitate soldering of the coil and the metal wire 241. Thereby, the metal wires 241 can support the objective lens holding seat 200 and enable the objective lens holding seat 200 to be movable in focusing direction and track direction. The focus coil 240 is located on the objective lens holding seat 200 and has the inductive magnetic field direction coinciding with the focusing direction of the converging objective lenses 201 and 202. The track coil 230 is located on the objective lens holding seat 200 and has the inductive magnetic field direction normal to the focusing direction, to serve as the track direction.

The magnetic path device aims to generate a magnetic field. The direction of the magnetic field is parallel with the inductive magnetic field direction of the track coil and normal to the inductive magnetic field direction of the focus coil. In the embodiment shown in FIG. 2, the magnetic path device includes the yoke 210, and the magnet 220 attached to the yoke 210. The yoke 210 has one or more sidewalls 211 and one or more inner walls 213, corresponding to the sidewalls 211. The magnet 220 is attached to the side wall 211. The magnet 220, sidewall 211, inner wall 213 and the bottom of the yoke 210 that is clamped between the side wall 211 and the inner wall 213 jointly form the magnetic path set forth above. The sidewall 211 has two flanges 212 extended from two sides towards the magnet. The flanges 212 have a bending angle of about 10 to 120 degrees to direct the magnetic field linedistribution of the magnetic field. The yoke 210 has an arched bottom extending outwards for adjusting the inclination angle during installation. There is a damper holding dock 250 fastened to the yoke through a screw 214 such, that the damper holding dock 250 is turning about the screw 214 relative to the yoke 210 to adjust the inclination angle of the actuator during installation of the optical system. The circuit board 260 is coupled to the surface of the damper holding dock 250. The metal wires 241 are connected to the circuit board 260, to establish electric connection with the exterior. An upper lid 270 is provided to protect the movable elements against external impact and prevent the movable elements from moving outside the allowable range.

Figure 3:
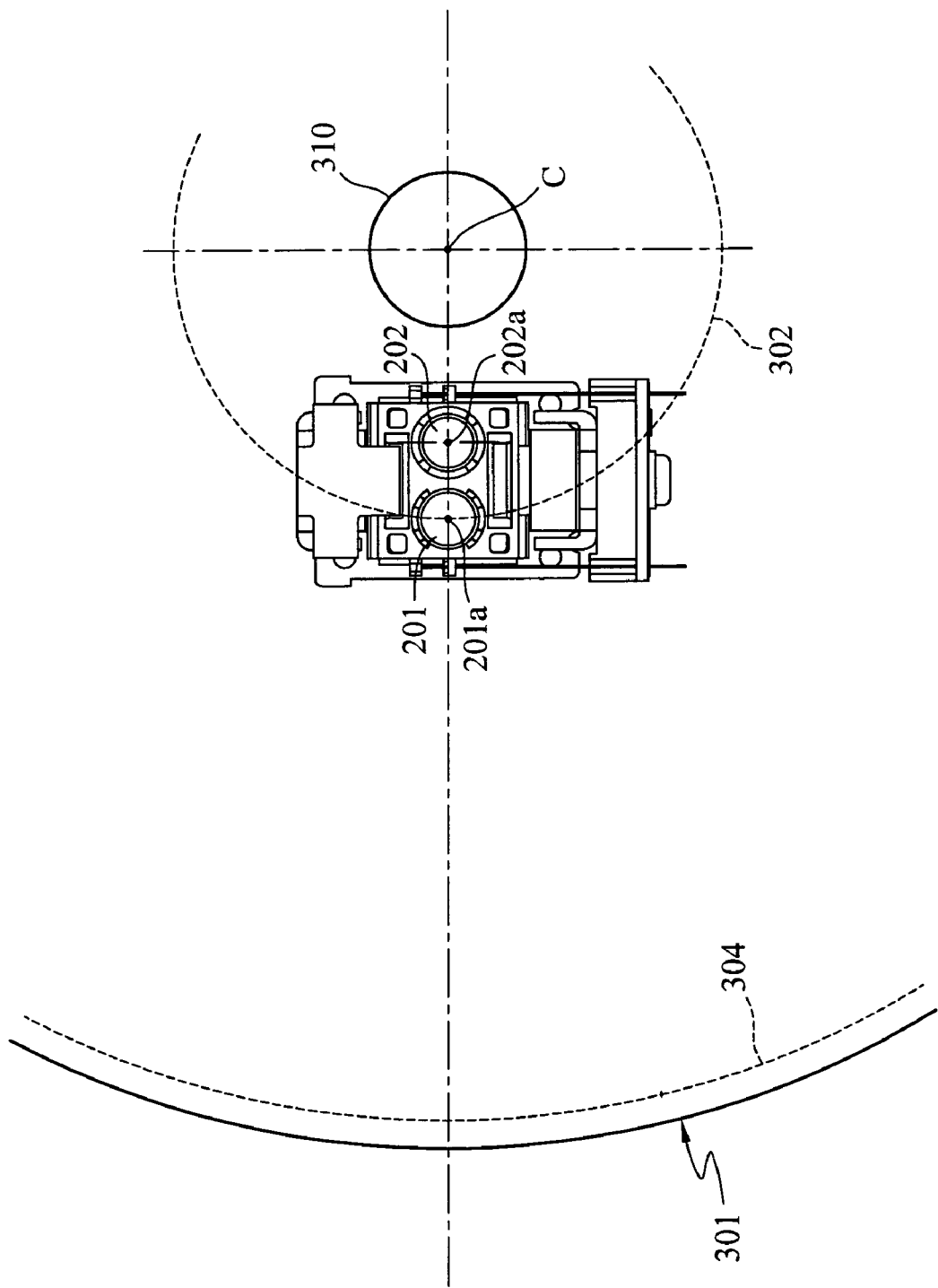
FIGS. 3 and 4 are plan views showing the movements of the actuator between the innermost track and the outmost track according to FIG. 2 of the present invention.
Figure 4:
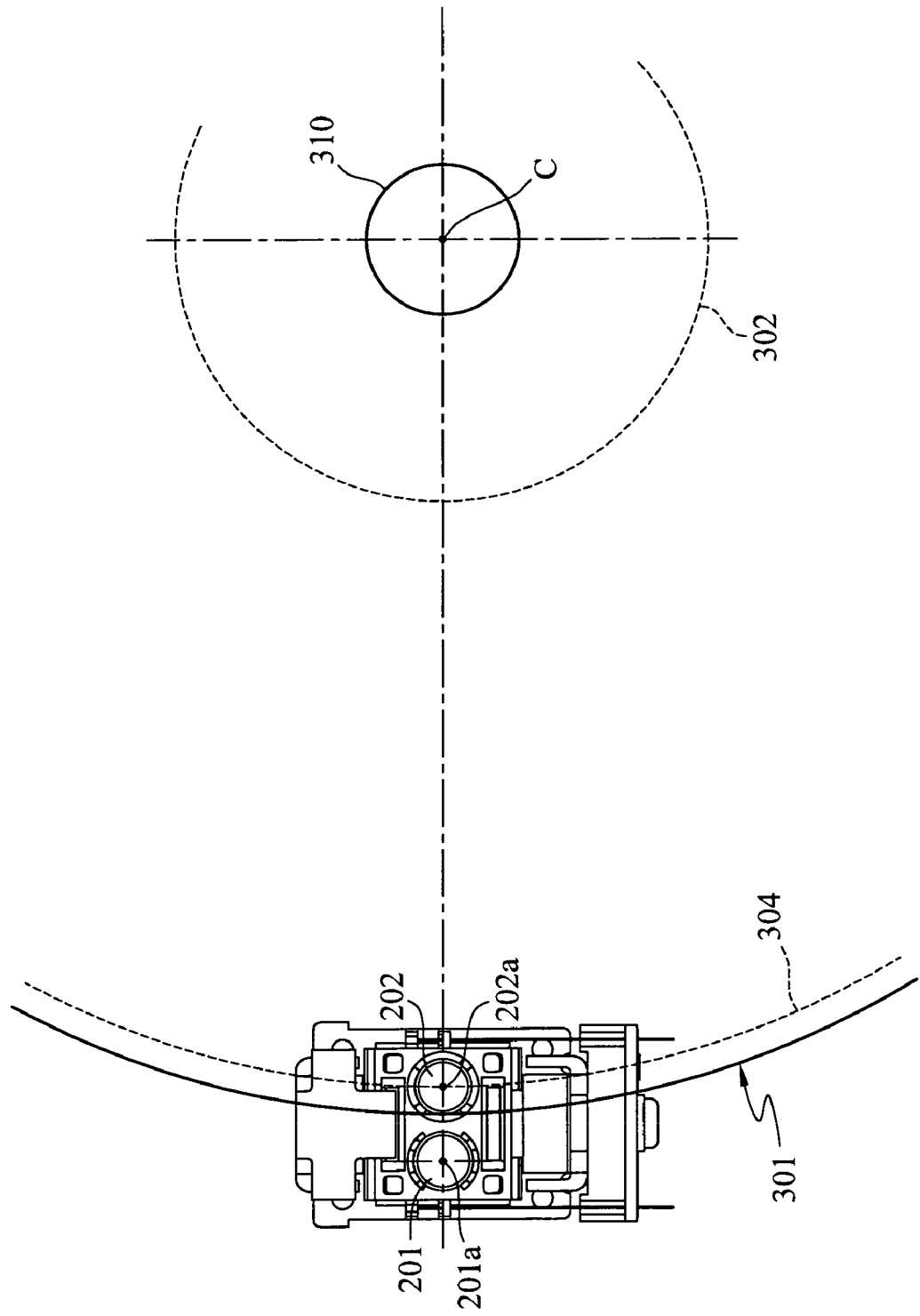

Refer to FIGS. 3 and 4 which are plan views showing the movements of the actuator between the innermost track and the outmost track according to FIG. 2 of the present invention. As is seen from FIGS. 3 and 4, each of the two objective lenses 201 and 202 of the two optical path systems respectively has a center 201a and 202a. Both centers 201a and 202a are arranged at a radial direction of the optical recording medium 301. Namely, both centers 210a and 202a of the two objective lenses 201 and 202 are arranged at a line passing through a center C of a drive shaft 310 while the actuator moves between an innermost track 302 and an outermost track 304 of the optical recording medium 301. Therefore, much more precise electric signals will be obtained by the optical head. This will be elaborated infra.

Figure 5:
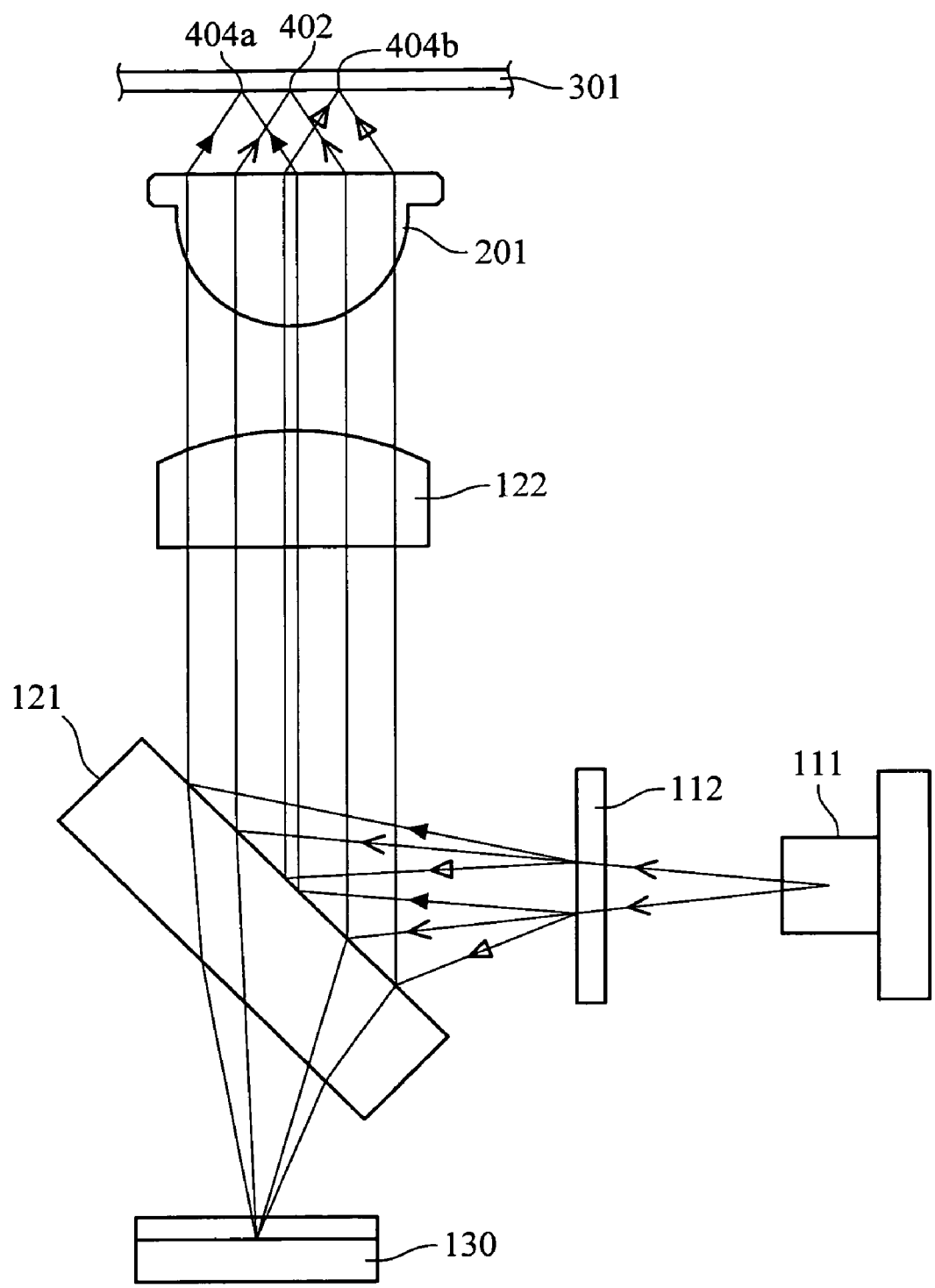
FIG. 5 is a side view showing the configuration of the first optical path system according to the present invention.
Figures 6A, 6B, 6C, 7:
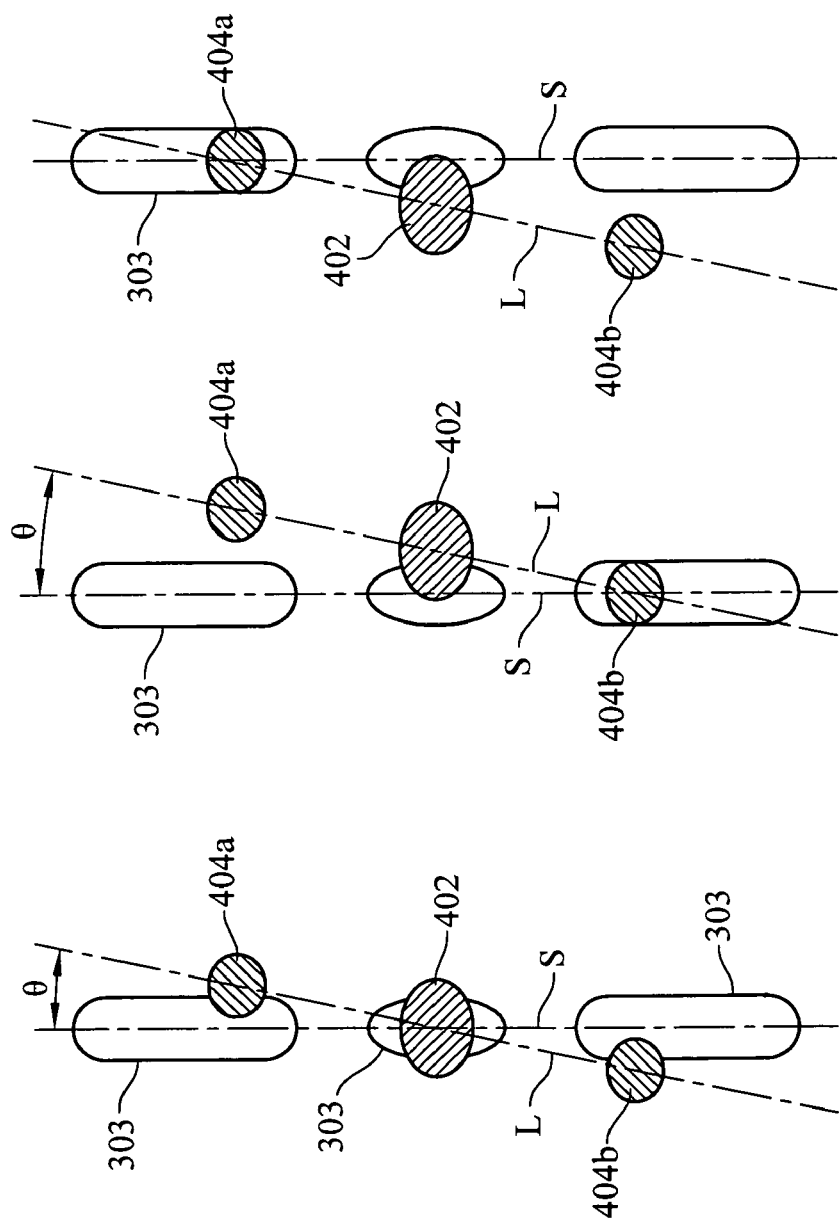
FIGS. 6A-6C are views schematically showing an arrangement of the main beam and the side beams on the optical recording medium.
FIG. 7 is a view schematically showing the relationship between the photo detector and spots reflected beams.

In detail, for example, FIG. 5 is a side view showing the configuration of the first optical path system according to the present invention. As shown in FIG. 5, the first optical path system is performed while the light beam generated by a laser diode 111 is partitioned by diffraction grating 112, into a main beam 402 and two side beams 404a, 404b. By the objective lens 201, the main beam 402 and the side beams 404a and 404b are respectively focused onto the optical recording medium 301. FIGS. 6A-6C are views schematically showing an arrangement of the main beam 404 and the side beams 404a, 404b on the optical recording medium 301. As shown in FIG. 6A, the main beam 402 is directed exactly onto the center of the track 303 of the optical recording medium 301 and the two side beams 404 are directed on the two sides of the main beam 402 and are directed onto the edge of the track 303. In generally, the main beam 402 and the two side beams 404 are arranged as a straight line L. More, the straight line L and the tangent line S of the track 303 at the position where the main beam 402 projects onto the track 303 define an angle θ shown as FIG. 6A. Thus, the optical head is driven to move between the innermost track 302 and the outermost track 304 of the optical recording medium 301. At this situation, please refer to FIG. 7, which is a view schematically showing the relationship between the photo detector and spots reflected beams 402, 404a, 404b. As shown in FIGS. 6A and 7, the main beam 402 accurately projects onto the track 303 without any deviation and then is reflected to the photo detector 130, i.e. photo diodes A to D, to read or write the data on the optical recording medium 30. The two side beams 404 respectively project onto the edge the track 303 and then are reflected to the photo detector 130, i.e. photo diodes E and F, to correct the position of the main beam 402 by tracking error detection. A tracking error signal (that is the difference between the intensity of the signal detected by photo diode E and the intensity of the signal detected by photo diode, denoting as E-F) is thus obtained on the basis of operational output among the output signals from these photo diodes E and F, as to show whether the main beam 402 is on-track on the optical recording medium 301 or not. If the analyzed tracking error signal (E-F) were about zero, it denotes the main beam 402 is on-track on the optical recording medium 301, such as shown in FIG. 6A. If the analyzed tracking error signal (E-F) were not zero, this shows the main beam 402 is not on-track on the optical recording medium 301, such as shown in FIGS. 6B and 6C. At this situation, the positions of the three beams are thus corrected by the diffraction gating 112 and the photo detector 130 until the main beam 402 is on-track on the optical recording medium 301.

Further, as stated above, referring back to FIG. 6A, which show the state in which the main beam 402 is on-track on the optical recording medium 301. The angle θ is formed by the straight line L that is determined by the three spots (the main beam 402 and the two side beams 404) and by the tangent line S of the track 303 at the position where the main beam 402 projects onto the track 303. Therefore, in this state, as the result of the centers 210a and 202a of the two objective lenses 201 and 202 are arranged at the radial direction of the optical recording medium 301, the angle θ formed by the straight line L and the tangent line S does remain the same during the actuator perform movement operation between the innermost track 302 and the outermost track 304 of the optical recording medium 301. Accordingly, the main beam 402 accurately projects onto each of the tracks of the optical recording medium 301 while the actuator performs the movement operation. Thus, precisely detecting the signals are obtained while the actuator moves between the innermost track 302 and the outermost track 304 of the optical recording medium 301.

In short, the present invention provides an optical head having dual optical paths and each center of the two objective lenses are arranged at the radial direction of the optical recording medium for further obtaining much more precise electric signals.

Still further, when the actuator moves at the innermost track 302 of the optical recording medium 301, the actuator would not collide with the spindle motor because of the shrunk size of the optical head. While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. An optical head having dual optical paths for reading and writing an optical recording medium, which has two different data storage densities, comprising:
    a first optical path system including:
        a first laser light generation unit to generate a first laser light;
        a first light guiding unit located on an optical path of the first laser light generation unit for direct traveling of the laser light;
        a first converging objective lens to receive the laser light from the first light guiding unit and focus the laser light on a data side of the optical recording medium; and
        a first photo detector to receive the laser light reflected from the optical recording medium to carry optical data signals of the data side and directed by the first light guiding unit;
    a second optical path system including:
        a second laser light generation unit to generate a second laser light that has a different wavelength from that of the first laser light;
        a second light guiding unit located on an optical path of the second laser light generation unit for direct traveling of the laser light;
        a second converging objective lens to receive the laser light from the second light guiding unit and focus the laser light on a data side of the optical recording medium; and
        a second photo detector to receive the laser light reflected from the optical recording medium to carry optical data signals of the data side and directed by the second light guiding unit;
        wherein the optical paths directed by the light guiding units of the first and second optical path systems are crossed at an angle between 30 to 150 degrees; and
    a single actuator, the first and second optical path systems being installed thereon, including:
        an objective lens holding seat having a top side that holds both the first and second converging objective lenses side by side, both centers of the first and second converging lens being arranged at a radial direction of the optical recording medium;

a focus coil located on the objective lens holding seat, having an inductive magnetic direction coinciding with the focusing direction of the first and second converging objective lenses;

a track coil located on the objective lens holding seat, having an inductive magnetic direction normal to the focusing direction to serve as a track direction;

a magnetic path device to generate a magnetic field, which has a direction parallel with the inductive magnetic direction of the track coil and is normal to the inductive magnetic direction of the focus coil, to produce reactions on the focus coil and the track coil;

a plurality of metal wires for bracing the objective lens holding seat, such that the objective lens holding seat is movable in the focusing direction and the track direction; and an upper lid to prevent movable elements of the actuator from moving outside an allowable range and being impacted by external forces.

2. The optical head having dual optical paths of claim 1, wherein each laser light generation unit includes a laser diode and a diffraction grating, the laser diode emitting the laser light, the diffraction grating dividing the laser light into an access laser light and a track laser light.

3. The optical head having dual optical paths of claim 1, wherein each light guiding unit includes a beam-splitter, a collimator and a folding mirror, the beam-splitter reflecting the laser light generated by the laser light generation unit, to pass through the collimator to become a parallel light, and to reach the folding mirror to be directed to the converging objective lens for focusing on the data side of the optical recording medium, then to be reflected by the data side to each light guiding unit and to be received by each photo detector.

4. The optical head having dual optical paths of claim 1, wherein each optical path system further includes a concave lens on the optical path of each of the first and second optical path systems before the laser light of each system enters the photo detector of each system.

5. The optical head having dual optical paths of claim 1, wherein the objective lens holding seat has a plurality of first lugs and second lugs extended from lateral sides, each of the first lugs having a conical opening to allow one of the metal wires to pass through, the second lugs being in contact with a distal end of the focus coil or the track coil.

6. The optical head having dual optical paths of claim 1, wherein the magnetic path device includes an yoke and at least one magnet, the yoke having at least one side wall and one corresponding inner wall, the magnet being attached to the side wall to generate a magnetic field, the inner wall holding the objective lens holding seat on the yoke.

7. The optical head having dual optical paths of claim 6, wherein the yoke has an arched bottom extending outwards.

8. The optical head having dual optical paths of claim 6, further having a damper holding dock fastened to the yoke through a screw such, that the damper holding dock is turning about the screw relative to the yoke to adjust the inclination angle.

9. The optical head having dual optical paths of claim 6, further having a circuit board, coupled on the surface of the damper holding dock to connect to the metal wires electrically.

* * * * *